(12) United States Patent
Yang et al.

(10) Patent No.: US 12,102,064 B1
(45) Date of Patent: Oct. 1, 2024

(54) PET FEEDER

(71) Applicant: JIANGSU WELL SPRING PET ARTICLES CO., LTD., Jiangsu (CN)

(72) Inventors: Tao Yang, Hangzhou (CN); Liang Gu, Hangzhou (CN); Jianchun Chen, Hangzhou (CN); Min Chen, Hangzhou (CN); Zhengjun Zhou, Hangzhou (CN); Yeyang Liao, Hangzhou (CN)

(73) Assignee: JIANGSU ZHONGHENG PET ARTICLES JOINT-STOCK CO., LTD., Yangcheng (CN)

( * ) Notice: Subject to any disclaimer, the term of this patent is extended or adjusted under 35 U.S.C. 154(b) by 0 days.

(21) Appl. No.: 18/688,396

(22) PCT Filed: Nov. 26, 2021

(86) PCT No.: PCT/CN2021/133484
§ 371 (c)(1),
(2) Date: Mar. 1, 2024

(87) PCT Pub. No.: WO2023/029242
PCT Pub. Date: Mar. 9, 2023

(30) Foreign Application Priority Data

Sep. 1, 2021 (CN) .......................... 202111022107.2

(51) Int. Cl.
*A01K 5/02* (2006.01)
(52) U.S. Cl.
CPC .......... *A01K 5/0283* (2013.01); *A01K 5/0225* (2013.01)

(58) Field of Classification Search
CPC .. A01K 5/0291; A01K 5/0283; A01K 5/0225; A01K 5/0275; A01K 5/02; A01K 5/01; A01K 5/0107; A01K 5/0114
See application file for complete search history.

(56) References Cited

U.S. PATENT DOCUMENTS

| | | | |
|---|---|---|---|
| 5,333,572 A * | 8/1994 | Nutt | A01K 5/02 239/397.5 |
| 10,609,899 B2 * | 4/2020 | Veness | A01K 5/0225 |
| 2019/0053463 A1 | 2/2019 | Hill | |
| 2021/0307289 A1* | 10/2021 | Baxter | A01K 5/0291 |

FOREIGN PATENT DOCUMENTS

| | | |
|---|---|---|
| CN | 107624665 A | 1/2018 |
| CN | 210382212 U | 4/2020 |
| CN | 111328729 A | 6/2020 |
| CN | 111512986 A | 8/2020 |
| CN | 211832338 U | 11/2020 |
| CN | 213695265 U | 7/2021 |
| WO | WO-2016072828 A2 * | 5/2016 ............. A01K 61/80 |

* cited by examiner

*Primary Examiner* — Ebony E Evans
(74) *Attorney, Agent, or Firm* — Bayramoglu Law Offices LLC

(57) ABSTRACT

A pet feeder is provided. The pet feeder includes a food container, a food exit passage, and a food tray. A first end of the food exit passage is in communication with the food container. The food tray is in communication with a second end of the food exit passage. A downwardly inclined guide portion is arranged on the food tray. The downwardly inclined guide portion extends away from a shell assembly and is connected to a feeding trough.

8 Claims, 14 Drawing Sheets

PET FEEDER

CROSS-REFERENCE TO THE RELATED APPLICATIONS

This application is the national phase entry of International Application No. PCT/CN2021/133484, filed on Nov. 26, 2021, which is based upon and claims priority to Chinese Patent Application No. 202111022107.2, filed on Sep. 1, 2021, the entire contents of which are incorporated herein by reference.

TECHNICAL FIELD

The present disclosure belongs to the technical field of pet supplies, and in particular relates to a pet feeder.

BACKGROUND

The description provided in this section merely provides background information related to the present disclosure and does not necessarily constitute the prior art.

With the expansion of pet market and the sharp increase of pet owners, solving pet owners' worries about their pets' food, clothing, housing and transportation has become an urgent need for pet owners. As an important part of the basic needs of pets, pet feeders have gradually been favored by pet owners.

Pet feeders can usually feed pets with a specific amount of food at a preset interval of time, providing convenience for pet owners. However, the existing pet feeders have the following shortcomings. After pet food is discharged from a pet feeder, most of the pet food is concentrated in the area near the food outlet in the feeding bowl, and pets often need to stretch their heads to the food outlet below the food container to eat the pet food. In addition, if pet food accumulates and agglomerates at the food outlet, the food supply passage may be blocked, leading to unsmooth food discharge. As a result, pet food in the pet feeder cannot be obtained and eaten by pets.

SUMMARY

The present disclosure aims to solve, at least to a certain extent, the technical problem of accumulation of a large amount of pet food at the food outlet.

To achieve the above objective, the present disclosure provides a pet feeder, including a food container; a food exit passage, where a first end of the food exit passage is in communication with the food container; and a food tray, which is in communication with a second end of the food exit passage, where a downwardly inclined guide portion is arranged on the food tray, and the downwardly inclined guide portion extends away from a shell assembly and is connected to a feeding trough.

In the pet feeder according to the present disclosure, pet food in the food container can reach the feeding trough far away from the food outlet through the combination of the food exit passage and the downwardly inclined guide portion, to reduce the accumulation of a large amount of pet food at the food outlet. In this way, the feeding experience, safety, and reliability of the pet feeder are improved, thereby bringing better services to pet owners and helping pet owners to keep their pets better and more at ease.

In addition, the pet feeder according to the present disclosure may further have the following additional technical features.

According to an embodiment of the present disclosure, the feeding trough is lower than the downwardly inclined guide portion, the food tray further includes a transition slope for connecting the downwardly inclined guide portion to the feeding trough, and a downward inclination angle of the transition slope is greater than a downward inclination angle of the downwardly inclined guide portion.

According to an embodiment of the present disclosure, a downward inclination angle formed between the downwardly inclined guide portion and a horizontal plane ranges from 15° to 40°.

According to an embodiment of the present disclosure, the pet feeder further includes a base, where a food tray base for placing the food tray is arranged on the base, a weighing sensor is connected between the food tray base and the base, and the food tray base is configured to displace vertically under a pressure of the food tray and act on the weighing sensor.

According to an embodiment of the present disclosure, the pet feeder further includes the shell assembly, where the shell assembly includes a rear shell and a front shell, the rear shell is arranged on the base, the front shell is engaged with the rear shell to define an accommodating space for accommodating the food container with the rear shell, and a food outlet is provided at a bottom of the front shell.

According to an embodiment of the present disclosure, the rear shell is configured as a C-shaped semi-barrel structure, an arc-shaped enclosing plate is arranged at a notch on the C-shaped semi-barrel structure and the arc-shaped enclosing plate is distributed in a circumferential direction of the notch, and the front shell is engaged with the C-shaped semi-barrel structure and the arc-shaped enclosing plate.

According to an embodiment of the present disclosure, a food distribution assembly is arranged at a bottom of the food container, the C-shaped semi-barrel structure and the arc-shaped enclosing plate form a support structure for the food distribution assembly, the food distribution assembly is in communication with the food outlet through a downwardly inclined tube extending through the support structure, and the food exit passage is formed inside the downwardly inclined tube.

According to an embodiment of the present disclosure, the food distribution assembly includes a food distribution bin arranged at the bottom of the food container, a food falling opening for communicating the food container with the food distribution bin is provided at a top of the food distribution bin, and a food distribution hole for communicating the food distribution bin with the food exit passage is provided at a bottom of the food distribution bin.

According to an embodiment of the present disclosure, the food distribution assembly includes a driving device and a turntable that is drivingly connected to the driving device, a plurality of flexible impellers located in the food distribution bin and distributed at intervals are arranged on a periphery of the turntable, and the food distribution bin is divided by the plurality of flexible impellers into a plurality of food distribution tanks which are stretchable.

According to an embodiment of the present disclosure, the plurality of flexible impellers each include a trapezoidal hollow structure, and two adjacent ones of the plurality of flexible impellers are laterally deformable under squeezing by pet food to enlarge a respective one of the plurality of food distribution tanks.

According to an embodiment of the present disclosure, the pet feeder further includes a cover assembly, where an elastic pressing assembly is arranged at a top of the cover assembly, and a side end of the elastic pressing assembly telescopically extends to a side wall of the cover assembly and is configured to engage with the shell assembly.

According to an embodiment of the present disclosure, a boss-shaped handle is arranged at the top of the cover assembly, two opposing side walls of the boss-shaped handle form two gripping members, and at least one of the two gripping members is connected through an elastic element to a slidable buckle extending out of the side wall of the cover assembly.

According to an embodiment of the present disclosure, a set of through-beam sensors are arranged inside the shell assembly, the set of through-beam sensors transmit signals at a predetermined height through the food container, and the food container is configured as a transparent food container.

BRIEF DESCRIPTION OF THE DRAWINGS

Various other advantages and benefits will become apparent to those of ordinary skill in the art by reading the following detailed description of preferred embodiments. The accompanying drawings are merely used for illustrating the preferred embodiments and are not intended to limit the present disclosure. Throughout the accompanying drawings, the same reference numerals are used to represent the same components. In the drawings.

Figure 1:
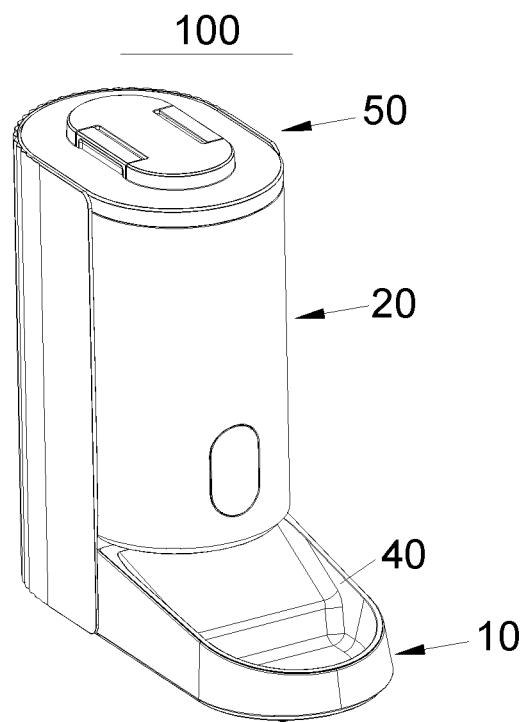
FIG. 1 is a schematic assembled structural view of a pet feeder according to an embodiment of the present disclosure.

LIST OF REFERENCE NUMERALS 100. pet feeder;
10. base; 11. support column; 12. weighing sensor;
20. shell assembly; 201. food outlet; 202. through-beam sensor; 21. rear shell; 211. arc-shaped enclosing plate; 212. through hole; 213. beveled engaging portion; 214. retaining slot; 215. hook; 22. front shell; 221. clasp; 222. engaging block; 23. downwardly inclined tube; 231. food exit passage;
30. food container; 301. limiting groove;
40. food tray; 41. downwardly inclined guide portion; 42. feeding trough; 43. transition slope; 431. transition stage; 44. food tray base; 441. sensing bracket;
50. cover assembly; 51. upper cover; 511. boss-shaped handle; 52. lower cover; 53. gripping member; 54. elastic element; 55. slidable buckle; 56. desiccant cover; 57. seal ring;
60. food distribution assembly; 601. food distribution bin; 6011. food falling opening; 6012. food distribution hole; 602. food distribution tank; 61. gear set; 611. driving shaft; 612. transmission shaft; 62. turntable; 621. flexible impeller; 63. partition plate; 64. food restriction brush; 65. stirring impeller.

DETAILED DESCRIPTION OF THE EMBODIMENTS

Exemplary embodiments of the present disclosure will be described in detail with reference to the accompanying drawings. Although the accompanying drawings show the exemplary embodiments of the present disclosure, it should be understood that the present disclosure may be implemented in various forms and is not limited to the embodiments described herein. Rather, these embodiments are provided for enabling a more thorough understanding of the present disclosure and fully conveying the scope of the present disclosure to those skilled in the art. It should be noted that a pet feeder having a cylindrical structure used in the present disclosure to illustrate the technical solution of the present disclosure is merely a preferred embodiment of the present disclosure, and is not intended to limit the protection scope of the technical solution of the present disclosure. For example, the pet feeder of the present disclosure may also be a rectangular barrel structure, etc. Such adjustment belongs to the protection scope of the technical solution of the present disclosure.

It should be understood that the terms used herein are for the purpose of describing particular example embodiments only and are not intended to be limiting. As used herein, the singular forms "a", "an" and "the" may also be meant to include the plural forms unless the context clearly indicates otherwise. The terms such as "comprise", "include", "have" and their variants are inclusive and therefore indicate the existence of stated features, elements, and/or components, but do not exclude the existence or addition of one or more other features, elements, components, and/or combinations thereof.

In the description of the present disclosure, unless otherwise clearly specified or defined, the terms such as "provide", "arrange", "connect", and their variants should be understood in a broad sense. For example, the connection may be a fixed connection, a detachable connection, or an integral connection; or the connection may be a direct connection or an indirect connection through an intermediate medium. Those skilled in the art may understand the specific meanings of the foregoing terms in the present disclosure according to specific situations.

In addition, the terms such as "first" and "second" are used merely for the purpose of description, and shall not be construed as indicating or implying relative importance or implying the quantity of indicated technical features. Therefore, a feature defined by "first" or "second" can explicitly or implicitly include one or more of said features. In the description of the present disclosure, unless otherwise clearly specified, "multiple" and "plurality of" mean at least two, e.g., two or three.

For ease of description, spatially relative terms such as "front", "rear", "circumferential", "peripheral", "top", "end", "outer", "bottom", "upper", "lower", "side", "inner", etc. may be used herein to describe a relationship between one element or feature and another element or feature as shown in the figures. Such spatially relative terms are intended to encompass other orientations of the mechanism in use or operation in addition to the orientations depicted in the figures. For example, if the mechanism in the figures is turned over, an orientation of an element described as "below another element or feature" or "beneath another element or feature" is changed to "over another element or feature" or "above another element or feature". Therefore, the exemplary term "below" may include two orientations: above and below. The mechanism may be otherwise oriented (rotated 90 degrees or at other orientations) and the spatially relative descriptors used herein interpreted accordingly.

Figure 2:
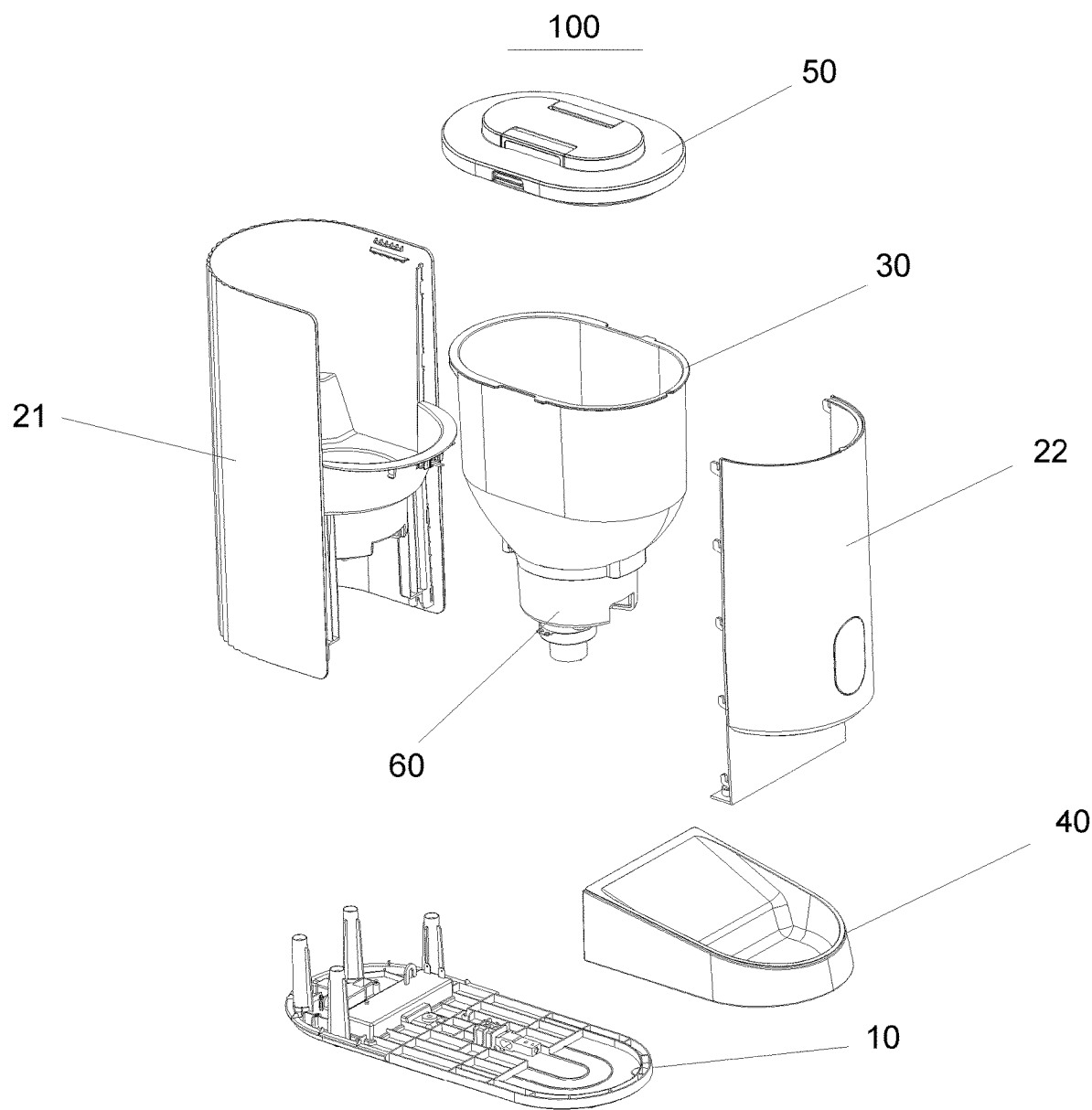
FIG. 2 is a schematic exploded structural view of the pet feeder shown in FIG. 1.
Figure 3:
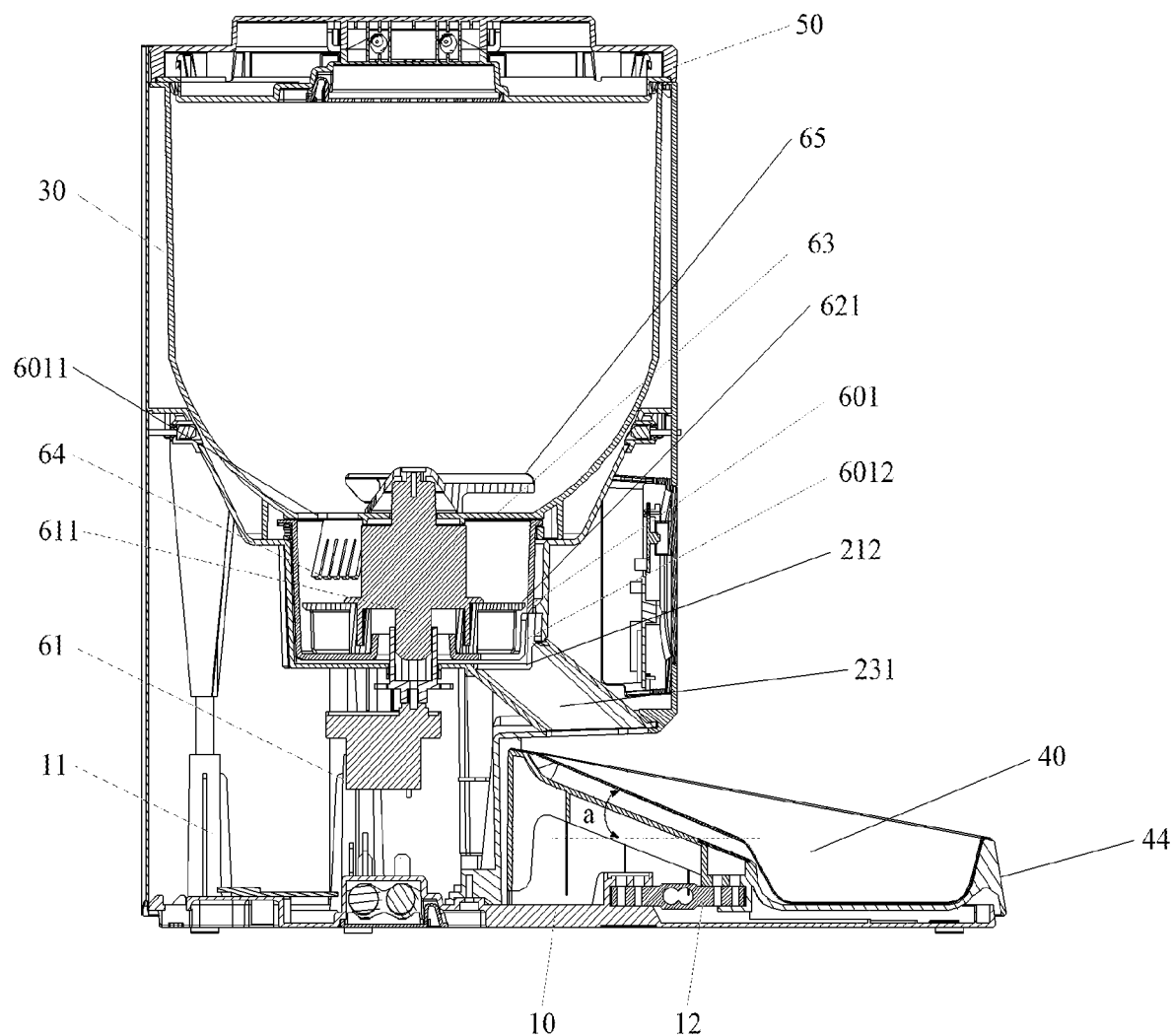
FIG. 3 is a cross-sectional view of the pet feeder shown in FIG. 1.

As shown in FIG. 1, FIG. 2, and FIG. 3, an embodiment of the present disclosure provides a pet feeder 100. The pet feeder 100 includes a base 10, a shell assembly 20, a food container 30, and a food tray 40. The shell assembly 20 is arranged on the base 10. A food outlet 201 is provided at a bottom of the shell assembly 20. The food container 30 is arranged inside the shell assembly 20. A food distribution assembly 60 is arranged at a bottom of the food container 30. A food exit passage 231 for communicating the food distribution assembly 60 with the food outlet 201 is provided between the food container 30 and the shell assembly 20. A first end of the food exit passage 231 is in communication with the food container 30. The food tray 40 is arranged on the base 10. The food tray 40 is in communication with a second end of the food exit passage 231. A downwardly inclined guide portion 41 matching with the food exit passage 231 and the food outlet 201 is arranged on the food tray 40. The downwardly inclined guide portion 41 extends away from the shell assembly 20 and is connected to a feeding trough 42.

In this embodiment, the food exit passage 231 may be configured as a downwardly inclined food exit passage inclined toward the food tray 40. In the pet feeder 100 of the present disclosure, pet food in the food container 30 can reach the feeding trough 42 far away from the food outlet 201 through the combination of the food exit passage 231 and the downwardly inclined guide portion 41, to reduce the accumulation of a large amount of pet food at the food outlet 201. In this way, the feeding experience, safety, and reliability of the pet feeder 100 are improved, thereby bringing better services to pet owners and helping pet owners to keep their pets better and more at ease.

During the use of the pet feeder 100, when pet food in the food container 30 passes through the food distribution assembly 60 and then falls downward under the action of gravity, the food exit passage 231 between the food container 30 and the shell assembly 20 guides the pet food to move in a downwardly inclined direction, so that the pet food has a horizontal velocity at the food outlet 201, and can move away from the food outlet 201 at the horizontal velocity. As such, the pet food can fall at a position on the downwardly inclined guide portion 41 far away from the food outlet 201. Then, guided by the downwardly inclined guide portion 41, the pet food can roll down toward a distal end of the downwardly inclined guide portion 41 far away from the food outlet 201, until the pet food rolls down into the feeding trough 42 on the downwardly inclined guide portion 41 far away from the shell assembly 20. In this case, pets can eat the pet food at the feeding trough 42. In this way, the accumulation of a large amount of pet food at the food outlet 201 to block the food outlet 201 is reduced, and pets do not need to stretch their heads to the food outlet 201 to eat the pet food.

The feeding trough 42 in the embodiment of the present disclosure is configured for holding pet food and has a certain depth, and may be configured as a spherical trough structure or a rectangular trough structure. The downwardly inclined guide portion 41 is a transition between the food outlet 201 and the feeding trough 42, and the height at which the downwardly inclined guide portion 41 is located gradually decreases in the direction from the food outlet 201 to the feeding trough 42, to make up for the height difference between the food outlet 201 and the feeding trough 42. In the embodiment of the present disclosure, in order for the pet food to roll down into the feeding trough 42, a downward inclination angle a formed between the downwardly inclined guide portion 41 of the food tray 40 and a horizontal plane is designed to be 15° to 40°. The inclination angle of the downwardly inclined guide portion 41 in the embodiment of the present disclosure is relatively gentle, to reduce the impact generated when the pet food rolls down into the feeding trough 42 through the downwardly inclined guide portion 41.

Figure 4:
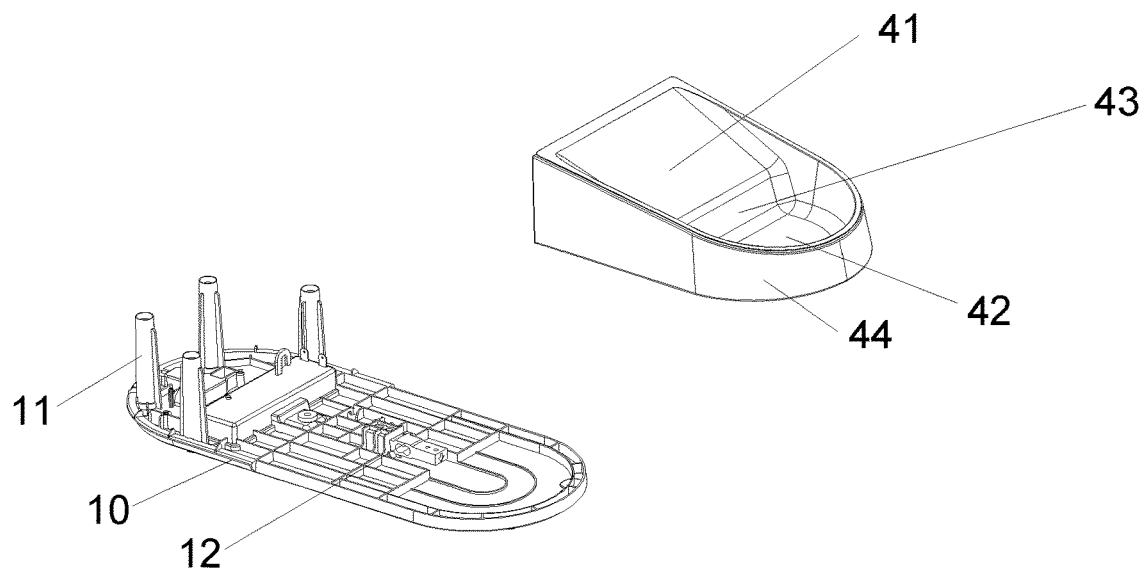
FIG. 4 is a schematic exploded structural view of a base and a food tray according to an embodiment of the present disclosure.
Figure 5:
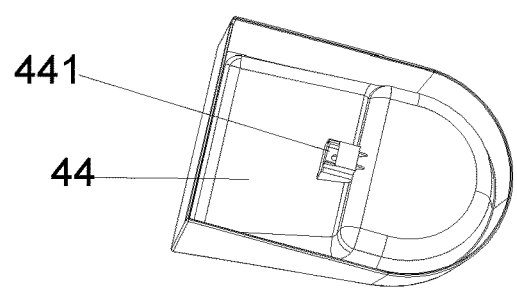
FIG. 5 is a top view of a food tray base according to an embodiment of the present disclosure.

As shown in FIG. 4 and FIG. 5, according to an embodiment of the present disclosure, a transition slope 43 with a steep gradient is further arranged between the downwardly inclined guide portion 41 and the feeding trough 42, and a downward inclination angle of the transition slope 43 is greater than a downward inclination angle of the downwardly inclined guide portion 41. A prominent vertical boundary step is formed between the downwardly inclined guide portion 41 and the feeding trough 42 through the transition slope 43, so that the pet food rolls down into the feeding trough 42 along the downwardly inclined guide portion 41 and the transition slope 43 under the action of gravity and falling velocity. After the feeding trough 42 is full, the pet food slowly piles up along the downwardly inclined guide portion 41 to the food outlet 201. In this way, the food discharge can be greatly increased and the risk of pet food piling up at and blocking the food outlet 201 can be reduced.

In addition, the transition slope 43 can also alleviate the problem that the length of the food tray 40 has to be increased since the downwardly inclined guide portion 41 is too gentle and too long. The transition slope 43 with a relatively large downward inclination angle allows for the transition of the downwardly inclined guide portion 41 to the feeding trough 42 within a relatively short distance, thereby reducing the overall length of the food tray 40 and reducing the space occupied by the food tray 40 in the length direction.

Figure 6:
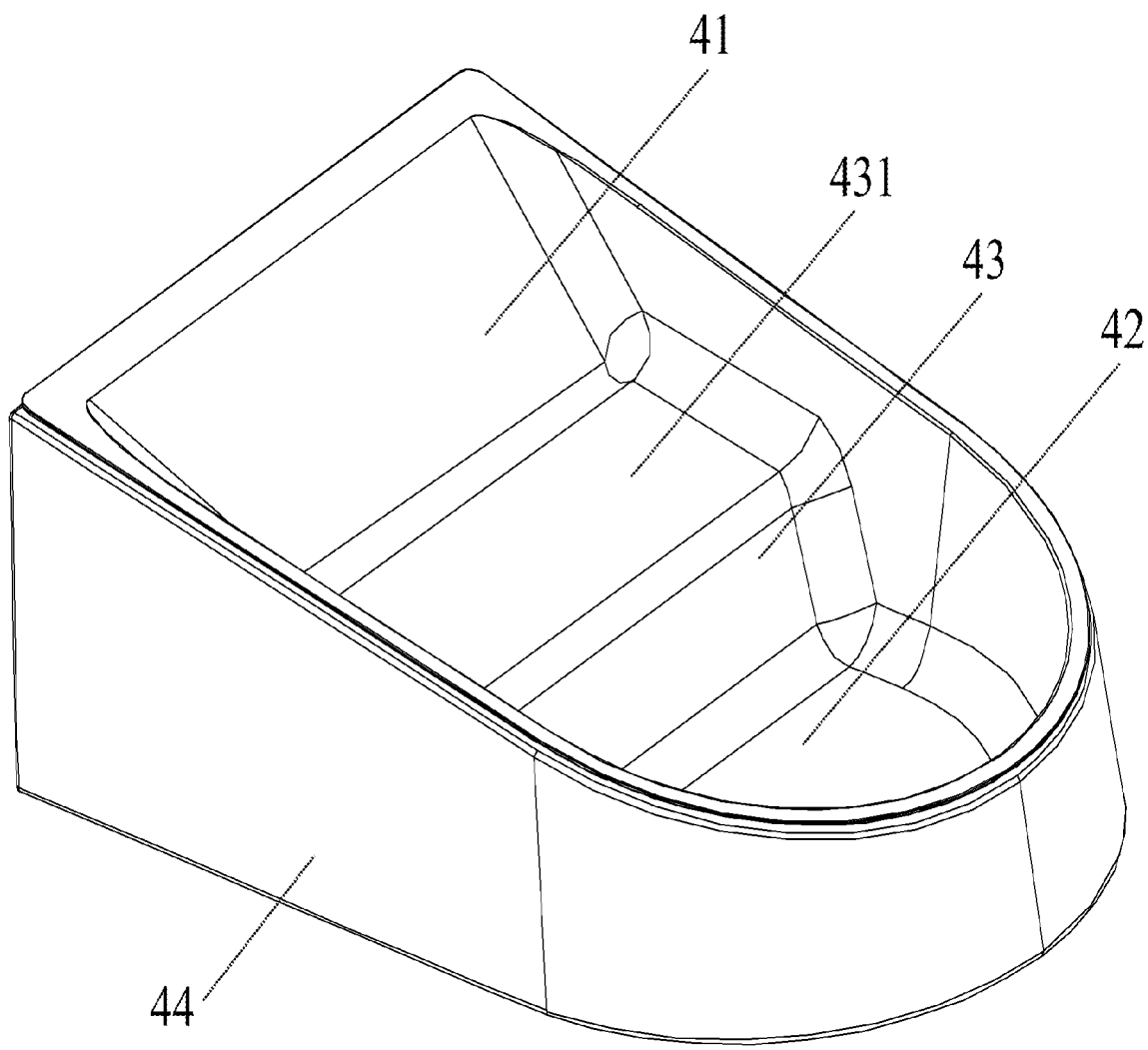
FIG. 6 is an assembled view of a food tray base and a food tray according to another embodiment of the present disclosure.

As shown in FIG. 6, according to an embodiment of the present disclosure, in the food tray 40, a transition stage 431 may further be arranged between the downwardly inclined guide portion 41 and the transition slope 43. In this case, the transition stage 431 can reduce the space occupied by the downwardly inclined guide portion 41 and the transition slope 43, thereby reducing the space in the feeding trough 42 occupied by the downwardly inclined guide portion 41 and the transition slope 43 and increasing the food storage capacity of the food tray 40.

Figure 7:
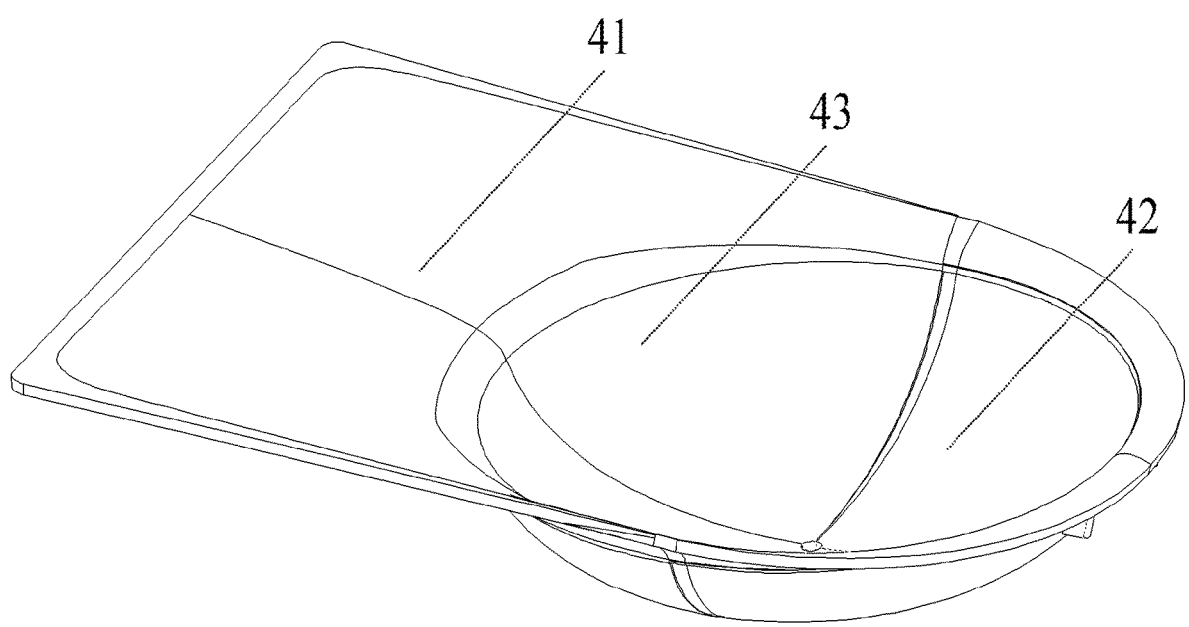
FIG. 7 is a schematic structural view of a food tray according to an embodiment of the present disclosure.

Alternatively, as shown in FIG. 7, according to an embodiment of the present disclosure, in the food tray 40, the downwardly inclined guide portion 41 may be directly in communication with the feeding trough 42, the feeding trough 42 is configured as an arc surface or a hemispherical surface in communication with the downwardly inclined guide portion 41, and the arc surface or hemispherical surface of the feeding trough 42 forms the transition slope 43. This can not only allow for a smoother flow of pet food between the downwardly inclined guide portion 41 and the feeding trough 42, but also further improve the food storage capacity of the food tray 40.

As shown in FIG. 3, FIG. 4, and FIG. 5, according to an embodiment of the present disclosure, a food tray base 44 for placing the food tray 40 is arranged on the base 10. The food tray base 44 includes a downwardly inclined support portion matching with the downwardly inclined guide portion 41 and a mounting groove matching with the feeding trough 42. A side plate in contact with the base 10 and supporting the food tray base 44 and the food tray 40 is arranged on a side portion of the food tray base 44. The side plate on the food tray base 44 defines an accommodating space located below the food tray base 44. A relatively large accommodating space is formed on the food tray base 44 between the downwardly inclined support portion and the base 10.

As shown in FIG. 3, FIG. 4, and FIG. 5, according to an embodiment of the present disclosure, a weighing sensor assembly is arranged in the accommodating space between the downwardly inclined support portion of the food tray base 44 and the base 10. An increase or a decrease of pet food in the food tray 40 can be accurately recorded by the weighing sensor assembly, so as to determine the food intake of pets.

Specifically, a first end of the food tray base 44 close to the shell assembly 20 is fixedly connected to the base 10, and a second end of the food tray base 44 away from the shell assembly 20 is suspended. The weighing sensor assembly includes a weighing sensor 12 and a sensing bracket 441. A first end of the weighing sensor 12 is fixedly arranged on the base 10, and a second end of the weighing sensor 12 is suspended below the food tray base 44. The sensing bracket 441 is arranged at a bottom of the suspended portion of the food tray base 44. The suspended portion of the food tray base 44 is connected to the weighing sensor 12 through the sensing bracket 441. The suspended portion of the food tray base 44 is displaced vertically under the action of the food tray 40 and pet food. During the vertical displacement, the food tray base 44 pushes or pulls the weighing sensor 12. The weighing sensor 12 determines an increase or a decrease of the pet food in the food tray 40 based on the pushing or pulling force received from the food tray base 44.

Further, in a case where the pet feeder 100 provides pet food for a plurality of pets, in order to accurately determine the food intake of each pet, a control board and a camera are further arranged on an inner wall of a front shell 22. The camera captures images of the pets and sends the images to the control board. The control board determines the food intake of each pet according to the images corresponding to the each pet and the increase or decrease of pet food corresponding to each pet.

Figure 8:
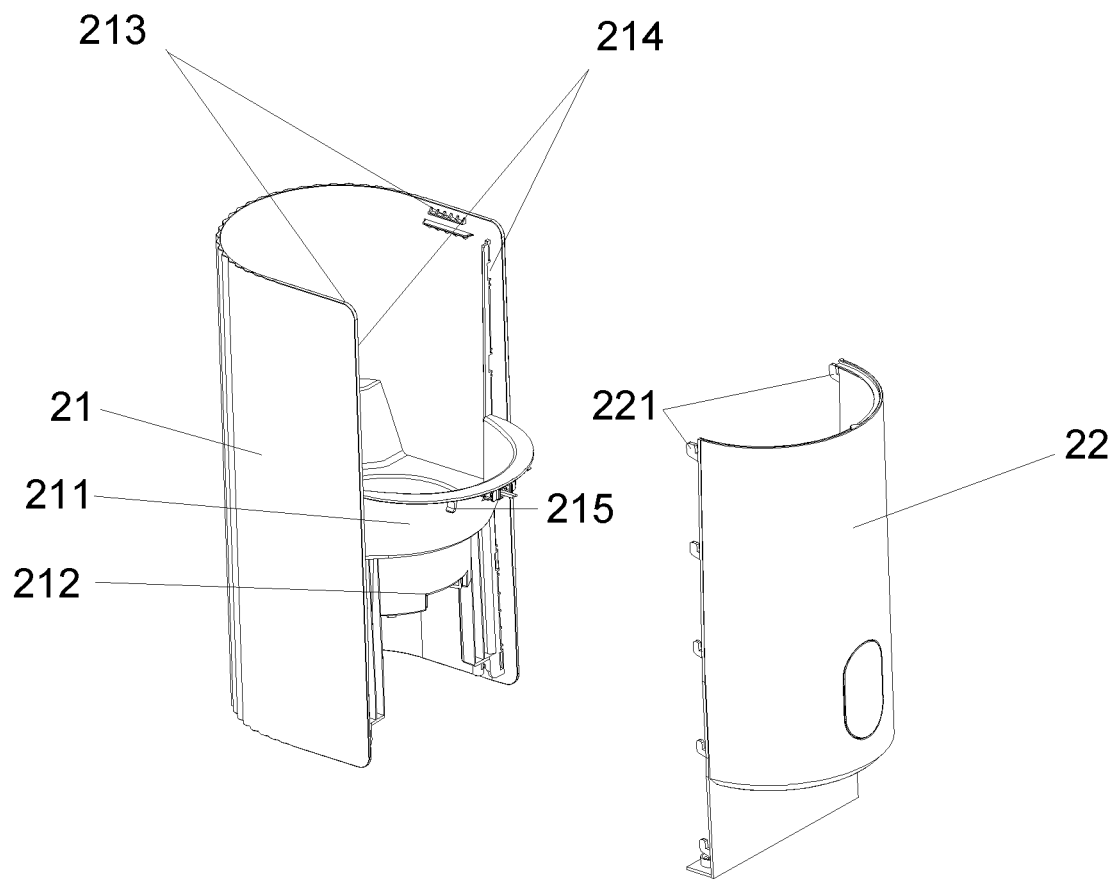
FIG. 8 is a schematic exploded structural view of a shell assembly of the pet feeder shown in FIG. 1.
Figure 9:
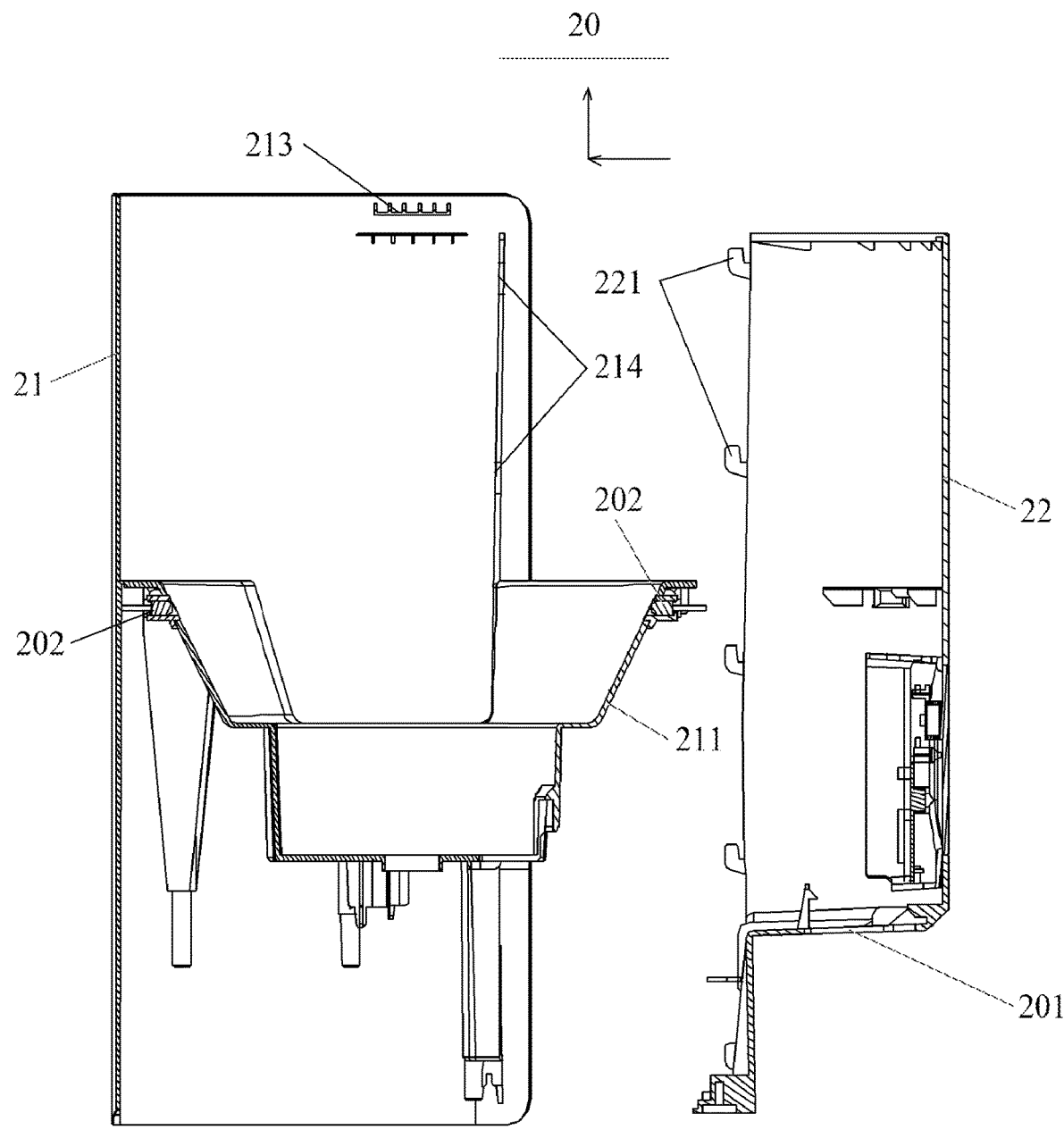
FIG. 9 is a cross-sectional view of the shell assembly shown in FIG. 8.
Figure 10:
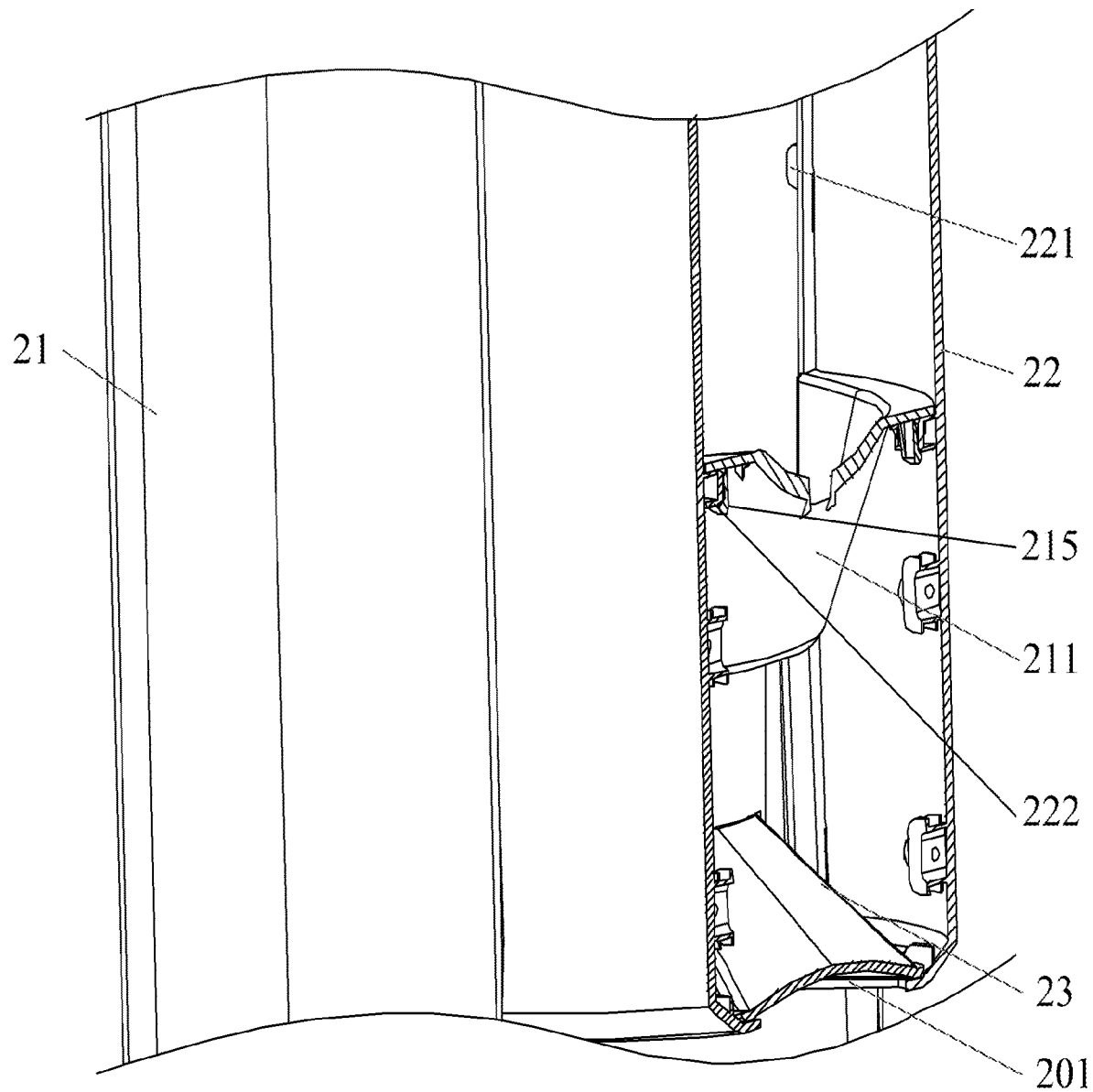
FIG. 10 is a partial cross-sectional view of the shell assembly of the pet feeder shown in FIG. 1.

As shown in FIG. 8, FIG. 9, and FIG. 10, according to an embodiment of the present disclosure, the shell assembly 20 includes a rear shell 21 and a front shell 22. The rear shell 21 is arranged on the base 10. The front shell 22 is engaged with the rear shell 21 to define an accommodating space for accommodating the food container 30 with the rear shell 21. The food outlet 201 is provided at a bottom of the front shell 22.

In this embodiment, the shell assembly 20 is the largest component among the components of the pet feeder 100, and the front shell 22 and the rear shell 21 are mounted and engaged with each other after the other components of the pet feeder 100 are mounted. Therefore, in order to simplify the assembly of the front shell 22 and the rear shell 21 of the pet feeder 100, in an embodiment of the present disclosure, during the assembly of the front shell 22 and the rear shell 21 of the pet feeder 100, the front shell 22 and the rear shell 21 are pre-mounted and pre-positioned by engaging, and then fastened by fasteners such as screws, to improve the overall structural stability and structural reliability of the shell assembly 20.

Specifically, the rear shell 21 is detachably mounted on support columns 11 of the base 10. After the front shell 22 and the rear shell 21 are pre-positioned and pre-mounted by engaging, the phenomenon of loosening of the front shell 22 and the rear shell 21 during the process of fastening the front shell 22 and the rear shell 21 by fasteners can be reduced, thereby improving the assembly efficiency of the front shell 22 and the rear shell 21.

As shown in FIG. 8, FIG. 9, and FIG. 10, the rear shell 21 is configured as a C-shaped semi-barrel structure, an arc-shaped enclosing plate 211 is arranged at a notch on the C-shaped semi-barrel structure and distributed in a circumferential direction of the notch, and the front shell 22 is engaged with the C-shaped semi-barrel structure and the arc-shaped enclosing plate 211.

In this embodiment, the front shell 22 and the rear shell 21 are pre-positioned by a detachable engaging member such as an elastic clasp assembly, and then fastened by fasteners such as screws. Through the process of positioning and fastening the front shell 22 and the rear shell 21, the front shell 22 is fixedly connected to the rear shell 21. The connection of the front shell 22 to both the C-shaped semi-barrel structure and the arc-shaped enclosing plate 211 can improve the connection strength and connection stability between the front shell 22 and the rear shell 21. An outer flange structure matching with the inner wall of the front shell 22 is further arranged at a top of the arc-shaped enclosing plate 211. The outer flange structure of the arc-shaped enclosing plate 211 increases the contact area between the rear shell 21 and the front shell 22, thereby reducing the phenomenon of excessive local force between the rear shell 21 and the front shell 22.

Specifically, a plurality of retaining slots 214 are provided at two sides of the notch of the rear shell 21. A plurality of upwardly bent clasps 221 respectively matching with the plurality of retaining slots 214 on the rear shell 21 are arranged at respective positions on the front shell 22. When the front shell 22 and the rear shell 21 are assembled, the front shell 22 is pushed toward the rear shell 21 so that the plurality of clasps 221 on the front shell 22 are inserted into the plurality of retaining slots 214 on the rear shell 21 in parallel. Then, the front shell 22 is pushed upward so that the plurality of clasps 221 hook the plurality of retaining slots 214 in the front-rear direction, thereby limiting the front shell 22 and the rear shell 21 in the front-rear direction.

Further, a plurality of downwardly extending hooks 215 facing the rear shell 21 are arranged on the arc-shaped enclosing plate 211 of the rear shell 21, and a plurality of engaging blocks 222 respectively matching with the plurality of hooks 215 on the rear shell 21 are arranged at respective positions on the front shell 22. In the process of pushing the front shell 22 upward, the plurality of engaging blocks 222 on the front shell 22 are engaged with the plurality of hooks 215 on the rear shell 21 respectively, thereby limiting the relative movement of the front shell 22 and the rear shell 21 in a vertical direction. The hooks 215 are configured as elastic hooks. In the process of pushing the front shell 22 upward, the engaging blocks 222 on the front shell 22 press the elastic hooks to deform, so that the engaging blocks 222 and the elastic hooks are engaged with each other, to elastically limit the front shell 22 and the rear shell 21 in the vertical direction.

When the front shell 22 and the rear shell 21 need to be disassembled, a top of the front shell 22 is pushed downward to cause the engaging blocks 222 to press the hooks 215 to deform and then release the engaging blocks 222 to release the vertical limiting of the front shell 22 and the rear shell 21. Then, the top of the front shell 22 is continuously pushed downward to align the clasps 221 on the rear shell 21 with the retaining slots 214 on the front shell 22, and then the front shell 22 is pulled away from the rear shell 21 to separate the front shell 22 from the rear shell 21. Whereby, the disassembly and assembly efficiency of the shell assembly 20 is greatly improved.

Referring to FIG. 8, FIG. 9, and FIG. 10, the C-shaped semi-barrel structure and the arc-shaped enclosing plate 211 form a support structure for the food distribution assembly 60, the food distribution assembly 60 is in communication with the food outlet 201 through a downwardly inclined tube 23 extending through the support structure, and the food exit passage 231 is formed inside the downwardly inclined tube 23.

In this embodiment, to realize the supporting of the food container 30 and the food distribution assembly 60 by the shell assembly 20, the arc-shaped enclosing plate 211 is arranged at the notch of the rear shell 21, and the arc-shaped enclosing plate 211 and the rear shell 21 form the support structure for the food distribution assembly 60. In addition, to provide an accommodating space for mounting the downwardly inclined tube 23 between the food distribution assembly 60 and the food outlet 201 of the front shell 22, the food distribution assembly 60 in the embodiment of the present disclosure includes a food distribution bin 601 having a tapered structure and arranged at the bottom of the food container 30. In this case, a relatively large mounting clearance is provided between the food distribution bin 601 and the food outlet 201 of the front shell 22. In the embodiment of the present disclosure, to support the food distribution bin 601 of the food distribution assembly 60, the bottom of the arc-shaped enclosing plate 211 is configured as a tapered structure extending toward the food distribution bin 601.

A food distribution hole 6012 is provided at a bottom of the food distribution bin 601. A bottom plate extending toward the food distribution bin 601 and located obliquely below the food distribution hole 6012 is arranged at the bottom of the front shell 22. The food outlet 201 located obliquely below the food distribution hole 6012 is provided on the bottom plate. The food distribution hole 6012 and the food outlet 201 each optionally have a flat opening structure, and the downwardly inclined tube 23 is configured as a flat tube structure for communicating the food distribution hole 6012 with the food outlet 201. The downwardly inclined tube 23 having the flat tube structure reduces the internal space of the shell assembly 20 occupied by the downwardly inclined tube 23 while ensuring the food discharge efficiency. Further, the downwardly inclined tube 23 is detachably connected to the food distribution bin 601 and the front shell 22, and a through hole 212 is provided on the arc-shaped enclosing plate 211, so that the downwardly inclined tube 23 extends through the arc-shaped enclosing plate 211 to communicate the food distribution hole 6012 on the food distribution bin 601 with the food outlet 201 on the front shell 22.

Figure 11:
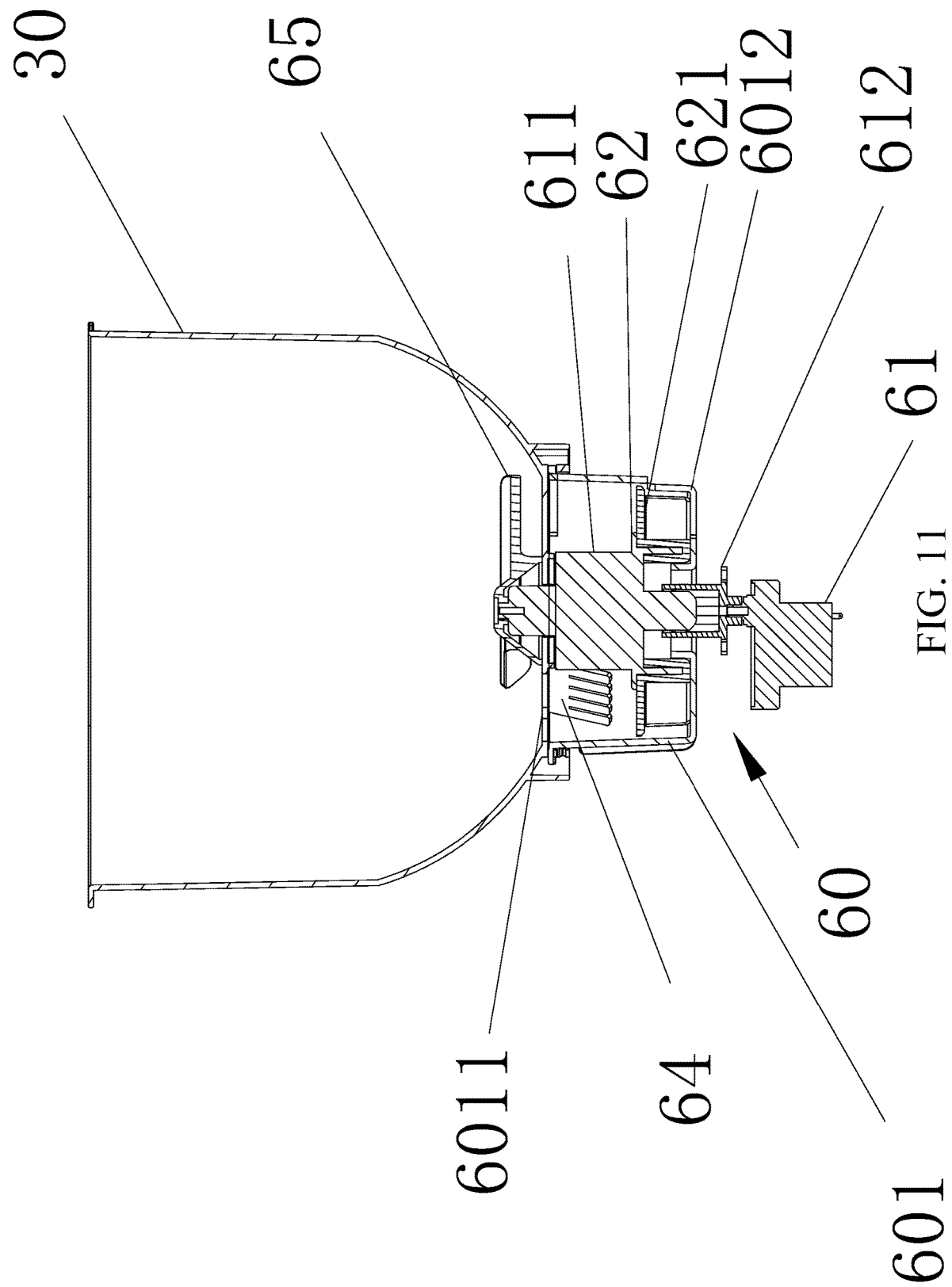
FIG. 11 is a schematic assembled structural view of a food container and a food distribution assembly according to an embodiment of the present disclosure.
Figure 12:
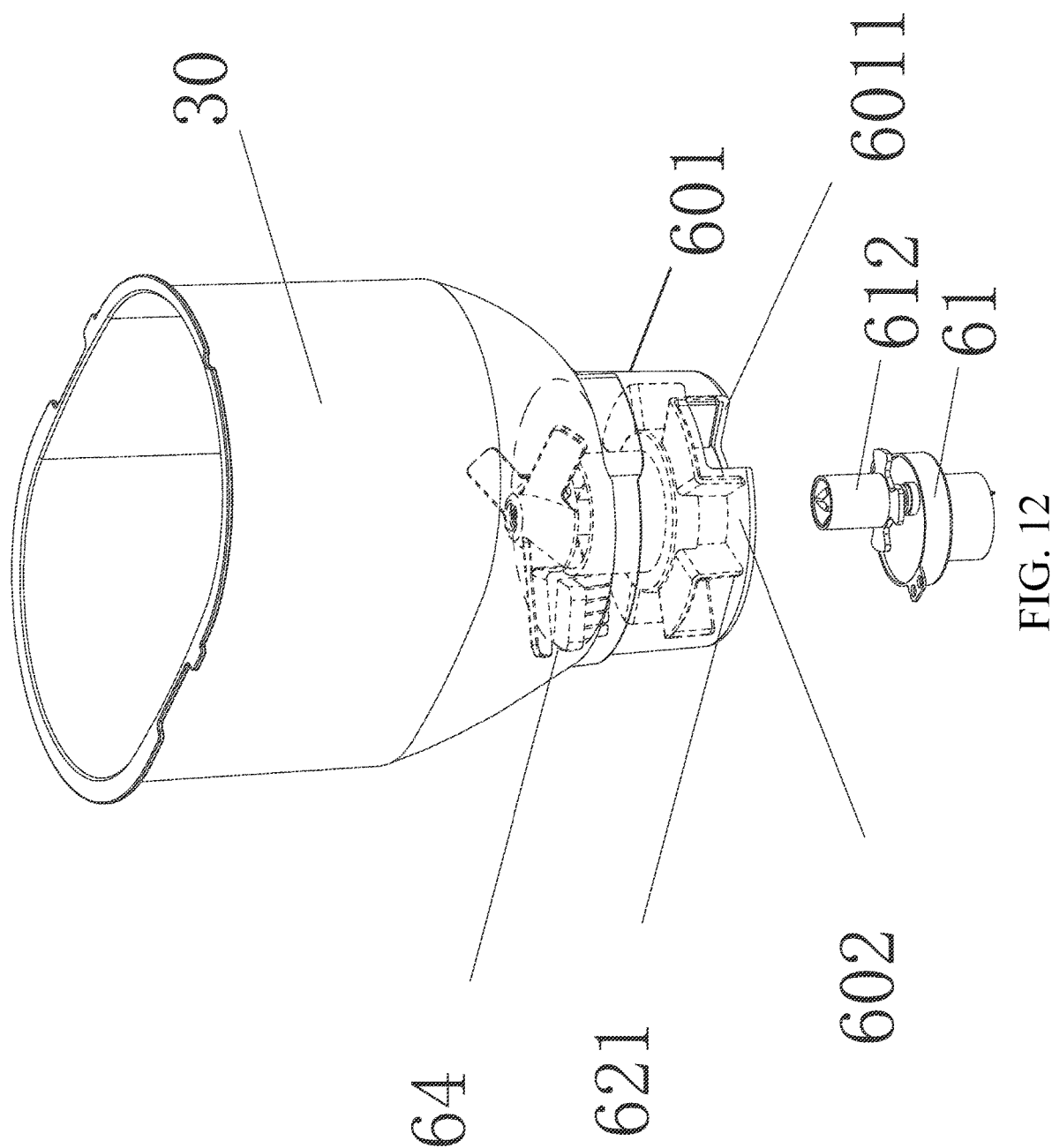
FIG. 12 is a schematic exploded structural view of the food container and the food distribution assembly shown in FIG. 11.
Figure 13:
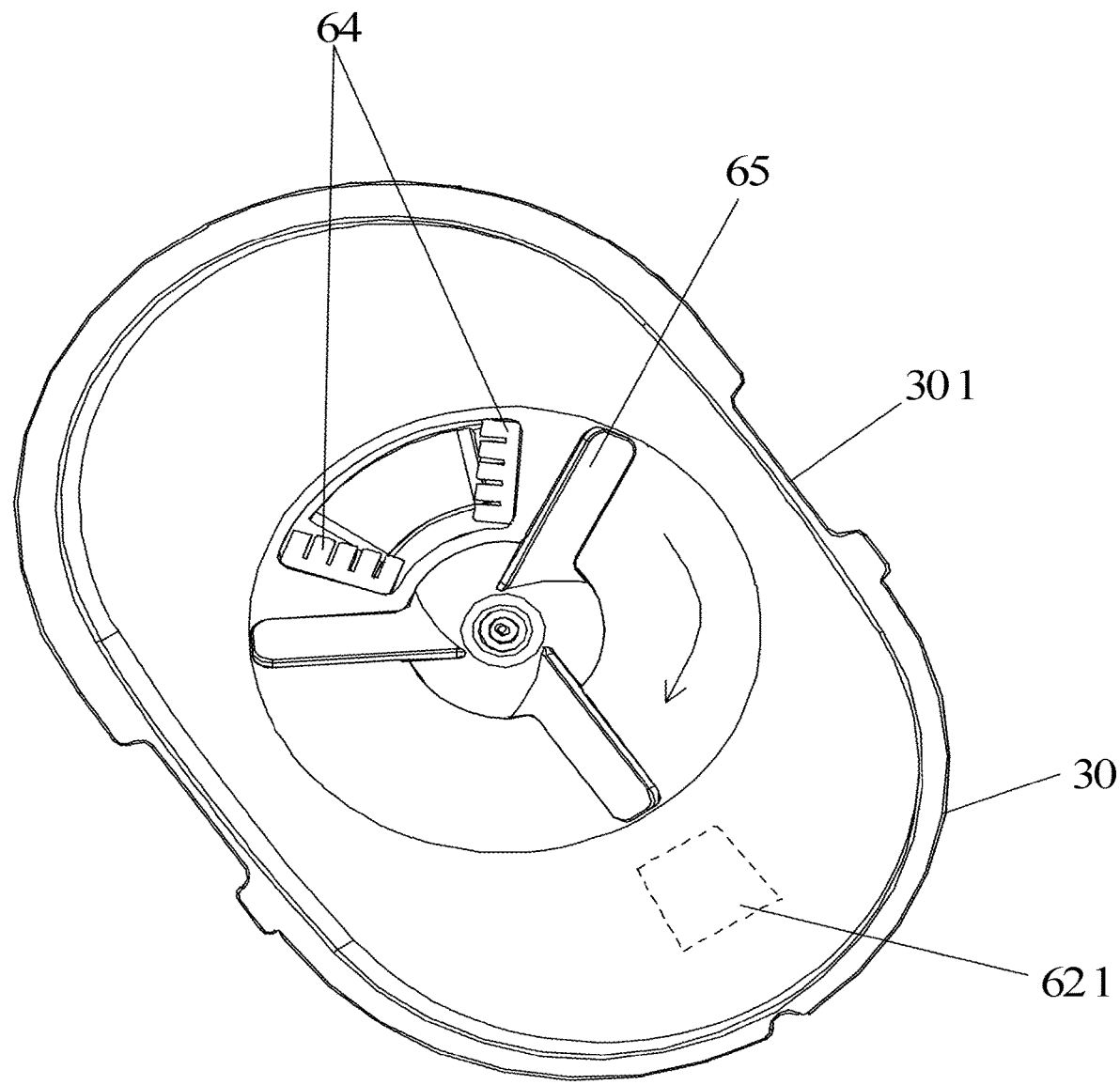
FIG. 13 is a top assembled view of the food container and the food distribution assembly shown in FIG. 12.

As shown in FIG. 11, FIG. 12, and FIG. 13, the food distribution assembly 60 further includes a driving device and a turntable 62 that is drivingly connected to the driving device, a plurality of flexible impellers 621 distributed at intervals are arranged on a periphery of the turntable 62, and the food distribution bin 601 is divided by the plurality of flexible impellers 621 into a plurality of food distribution tanks 602 which are stretchable.

In this embodiment, the driving device includes a driving motor and a transmission assembly arranged at a driving end of the driving motor. The transmission assembly may include a gear set 61 and a transmission shaft 612. The transmission shaft 612 is connected to the driving shaft 611. The turntable 62 is arranged on the driving shaft 611. The driving motor drives the turntable 62 to rotate through the gear set 61, the transmission shaft 612, and the driving shaft 611, to convey pet food falling at the food distribution tanks 602 between the plurality of flexible impellers 621 to a position corresponding to the food exit passage 231.

The plurality of flexible impellers 621 in the embodiment of the present disclosure can meet different requirements of small precise servings of pet food and servings of large-particle pet food on the food distribution tanks. Small precise servings of pet food require relatively small food distribution tanks 602, while servings of large-particle pet food require relatively large food distribution tanks 602. In the embodiment of the present disclosure, the flexible impellers 621 each are configured as a flexible structure, and a large number of flexible impellers 621 are arranged on the periphery of the turntable 62 to reduce the volume of a respective food distribution tank 602 of the food distribution tanks 602 between two adjacent ones of the plurality of flexible impellers 621 to meet the requirement of small precise servings of pet food for relatively small food distribution tanks 602. In addition, when large-particle pet food falls into the respective food distribution tank 602, two adjacent ones of the plurality of flexible impellers 621 can deform laterally under squeezing by the large-particle pet food to increase the volume of the respective food distribution tank 602, thereby meeting the requirement of servings of large-particle pet food for relatively large food distribution tanks 602.

According to the embodiment of the present disclosure, the number of impellers includes but is not limited to 4, and the volume of each of the food distribution tanks 602 can be adjusted by adjusting the number and height of the impellers, so as to adjust the amount of pet food in a single serving from the pet feeder 100. For example, the plurality of flexible impellers 621 each include a trapezoidal hollow structure, a rectangular hollow structure, or a triangular hollow structure. When the flexible impellers 621 are configured as trapezoidal hollow structures, two adjacent ones of the plurality of flexible impellers 621 can form a funnel-shaped food distribution tank 602 having a large upper end and a small lower end, and the flexible impellers 621 can have good deformation ability, so that the food distribution tanks 602 are stretchable.

According to the embodiment of the present disclosure, the food distribution assembly 60 further includes the food distribution bin 601 arranged at the bottom of the food container 30. The turntable 62 and the plurality of flexible impellers 621 are arranged in the food distribution bin 601. The food distribution bin 601 is divided by the flexible impellers 621 into a plurality of food distribution tanks 602 which are stretchable. The plurality of flexible impellers 621 are in close contact with an inner wall of the food distribution bin 601, so that the pet food cannot enter the closed space formed between the flexible impellers 621 and the inner wall of the food distribution bin 601. A partition plate 63 is arranged between the food distribution bin 601 and the food container 30. A food falling opening 6011 for communicating the food container 30 with the food distribution tanks 602 is provided on the partition plate 63. The food distribution hole 6012 for communicating the food distribution tanks 602 with the food exit passage 231 is provided at the bottom of the food distribution bin 601.

In this embodiment, the driving motor and the gear set 61 of the food distribution assembly 60 are both arranged outside the food distribution bin 601, and a portion of the transmission shaft 612 which is connected to the gear set 61 extends into the food distribution bin 601 and is connected to the driving shaft 611. As such, the driving motor and the gear set 61 do not occupy the internal space of the food distribution bin 601. The food falling opening 6011 provided at the top of the food distribution bin 601 and the food distribution hole 6012 provided at the bottom of the food distribution bin 601 are staggered. Pet food falling from the food falling opening 6011 can only be replenished to a food distribution tank 602 of the food distribution tanks 602 in the food distribution bin 601 at a time. The food distribution tank 602 filled up with pet food is driven by the driving device of the food distribution assembly 60 to rotate to the food distribution hole 6012, and then the pet food falls from the food distribution hole 6012 to the food tray 40, thereby providing small precise servings of pet food.

Further, a stirring impeller 65 is further arranged at a portion of the driving shaft 611 of the food distribution assembly 60 which extends to the food container 30. After a user places pet food in the food container 30 and the pet feeder 100 is powered on, the driving motor of the food distribution assembly 60 drives the transmission assembly to rotate. The transmission assembly simultaneously drives, through the driving shaft 611, the stirring impeller 65 and the flexible impellers 621 to rotate. After being stirred by the stirring impeller 65, the pet food from the food container 30 falls through the food falling opening 6011 to the food distribution bin 601. The flexible impellers 621 are driven by the driving shaft 611 to rotate. When the food distribution tank 602 filled up with pet food rotates to the food distribution hole 6012 on the food distribution bin 601, pet food originally stored in the food distribution tank 602 flows out of the food distribution hole 6012 and falls into the food tray 40 through the food exit passage 231. In this way, the pet food is intermittently discharged in portions, making the food discharge more accurate.

When the product is switched to a standby mode or shut down, the flexible impellers 621 rotate to the food distribution hole 6012 on the food distribution bin 601 and completely block the food distribution hole 6012 to seal the food distribution hole 6012 on the food distribution bin 601, and then the flexible impellers 621 stop at the food distribution hole 6012 to seal the food distribution bin 601, to prevent insects, ants, and the like from entering the food distribution bin 601.

Food restriction brushes 64 extending into the food distribution bin 601 are further arranged at the food falling opening 6011 of the food distribution bin 601. The food restriction brushes 64 are respectively arranged on two sides of the food falling opening 6011 of the food distribution bin 601. After entering the food distribution bin 601, the pet food first accumulates in the food distribution tank 602 in the non-impeller area. After the food distribution tank 602 is filled up with the pet food, the pet food accumulates on the respective flexible impellers 621. As a result, each time one food distribution tank 602 rotates across the food distribution hole 6012, more pet food than the designed amount falls to the food tray 40, resulting in excessive food discharge. In the embodiment of the present disclosure, with the arrangement of the food restriction brushes 64 at the food falling opening 6011, when the flexible impellers 621 drive the pet food to rotate, the food restriction brushes 64 scrape excess pet food above the food distribution tank 602 to the next food distribution tank 602, to ensure that each serving of pet food is of the same size, thereby achieving precise food discharge.

According to the embodiment of the present disclosure, a mounting stage is arranged at a position corresponding to the arc-shaped enclosing plate 211 on an inner wall of the rear shell 21. A side wall contour of the mounting stage is configured to conform to an outer contour of the food container 30. Two through-beam sensors 202 corresponding to each other are arranged on the mounting stage and the arc-shaped enclosing plate 211. Mounting slots for mounting the through-beam sensors 202 are provided on both the mounting stage and the arc-shaped enclosing plate 211. The through-beam sensor 202 is first mounted in a limiting cylinder, and then the limiting cylinder is engaged with the mounting grooves on the mounting stage and the arc-shaped enclosing plate 211 by two clasps.

The function of the through-beam sensors 202 is to determine whether there is pet food in the food container 30 based on whether one sensor receives an infrared ray emitted by the other sensor, to remind the user to replenish pet food in a timely manner. The food container 30 is made of a transparent material. When there is sufficient pet food in the food container 30 and the height of the pet food is higher than the positions of the through-beam sensors 202, the through-beam sensors 202 cannot receive infrared signals, and a controller determines that there is sufficient pet food in the food container 30. When the height of the pet food in the food container 30 is lower than the through-beam sensors 202, the through-beam sensors 202 can receive infrared signals, and the controller determines that pet food in the pet feeder 100 is insufficient, and returns the information to an APP terminal to remind the user to replenish pet food in a timely manner.

Figure 14:
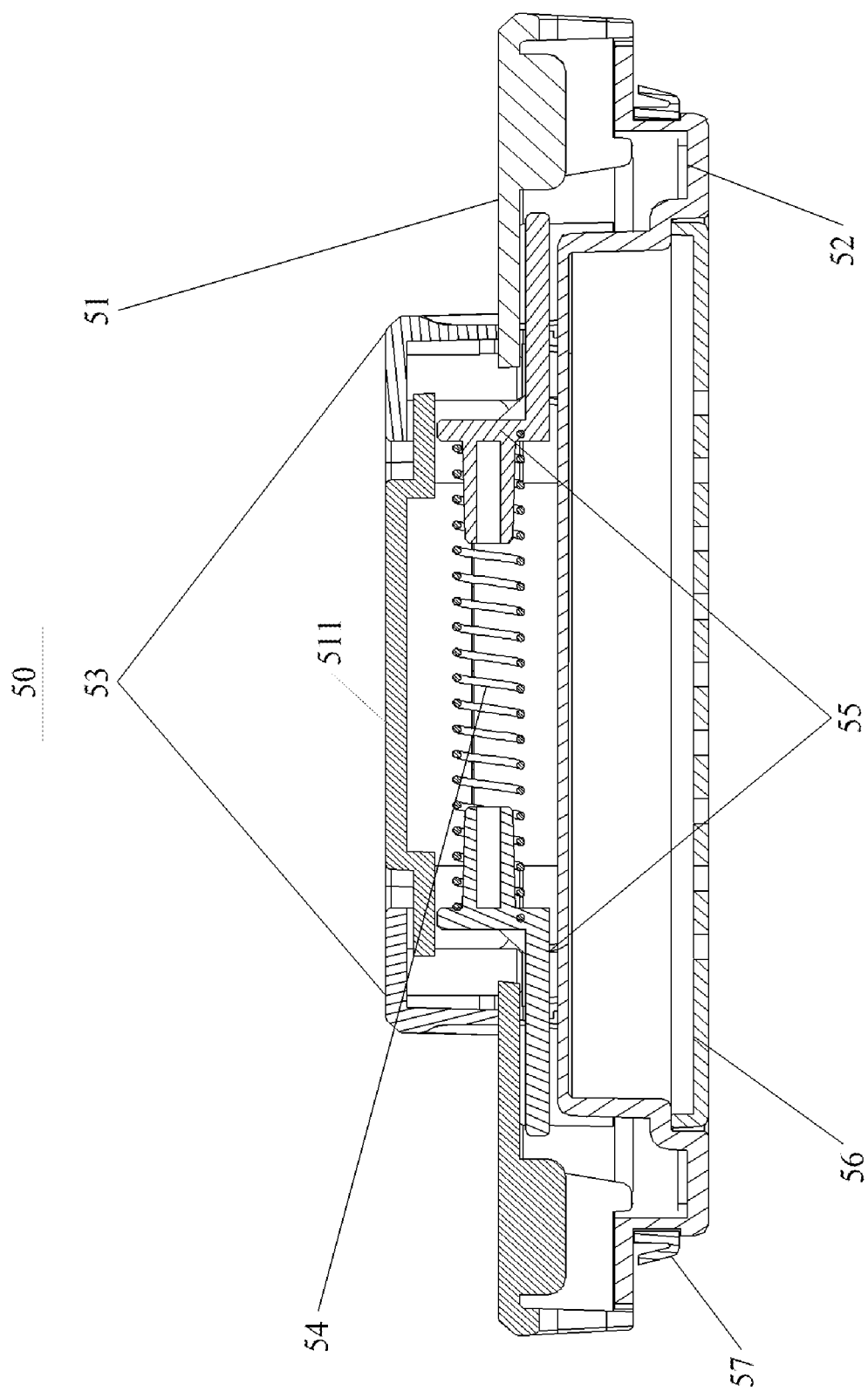
FIG. 14 is a cross-sectional view of a cover assembly according to an embodiment of the present disclosure.
Figure 15:
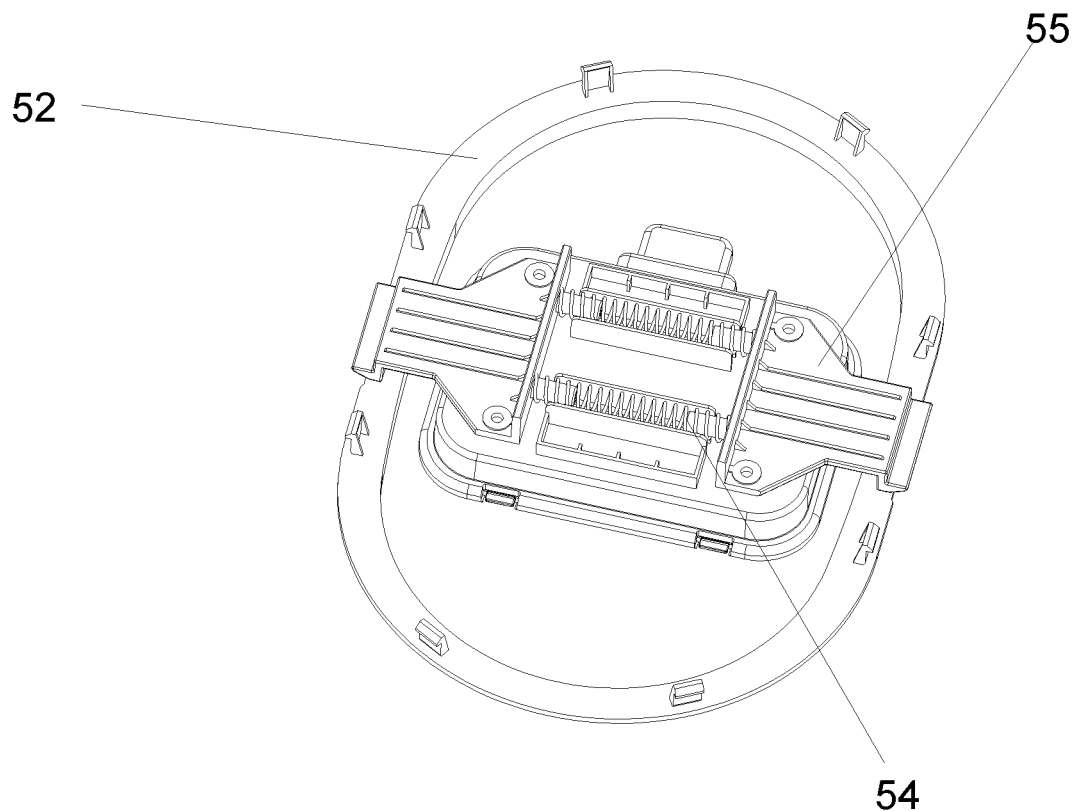
FIG. 15 is a schematic exploded structural view of a cover assembly according to an embodiment of the present disclosure.

As shown in FIG. 14 and FIG. 15, according to an embodiment of the present disclosure, the pet feeder 100 further includes a cover assembly 50. An elastic pressing assembly is arranged at a top of the cover assembly 50, and a side end of the elastic pressing assembly telescopically extends to a side wall of the cover assembly 50 and is configured to engage with the shell assembly 20. A boss-shaped handle 511 is arranged at the top of the cover assembly 50. Two opposing side walls of the boss-shaped handle 511 form two gripping members 53. At least one of the gripping members 53 is connected through an elastic element 54 to a slidable buckle 55 extending out of the side wall of the cover assembly 50.

In this embodiment, the cover assembly 50 includes a lower cover 52, an upper cover 51, the gripping members 53, the elastic element 54, and the slidable buckle 55. When the user intends to cover the cover assembly 50, the user may directly hold the two gripping members 53 of the cover assembly 50 with one hand and place the cover assembly 50 at an opening of the shell assembly 20. The user may press the gripping members 53 in advance so that the two slidable buckles 55 are retracted toward the inside of the cover assembly 50, and then place the cover assembly 50 at the opening of the shell assembly 20 and release the gripping members 53. As such, the cover assembly 50 is covered on the pet feeder 100. Alternatively, the user does not need to press the gripping members 53, but instead, the user directly presses the cover assembly 50 to the opening of the shell assembly 20. After coming into contact with a beveled engaging portion 213 at the opening of the shell assembly 20, an inclined surface of the slidable buckle 55 retracts and slides inward, until the slidable buckle 55 is engaged with the beveled engaging portion 213 at the opening.

When the user intends to remove the cover assembly 50, the user may squeeze the gripping members 53 with one hand to cause the slidable buckles 55 to retract toward the inside of the cover assembly 50, so that the slidable buckle 55 is separated from the engaging portion of the shell assembly 20, and then remove the cover assembly 50 from the shell assembly 20.

As shown in FIG. 15, the gripping members 53, the elastic element 54, and the slidable buckles 55 constitute the elastic pressing assembly. The gripping members 53 are fastened to the slidable buckle 55 by screws or engaging portions. A first end of the slidable buckle 55 is an engaging portion for engaging with the beveled engaging portion at the opening of the shell assembly 20. A second end of the slidable buckle 55 is a mounting column for mounting the elastic element 54. The elastic element 54 is mounted on the mounting columns of the two slidable buckles 55. A limiting rib for limiting the elastic element 54 and a limiting rib for limiting the slidable buckle 55 are arranged on each of the upper cover 51 and the lower cover 52 of the cover assembly 50. The beveled engaging portion is arranged protruding from an inner wall of the shell assembly 20. In order for the food container 30 to avoid the beveled engaging portion, the food container 30 is in clearance fit with the shell assembly 20, and an outer flange structure is arranged at an opening of the food container 30. The clearance between the food container 30 and the shell assembly 20 is blocked by the outer flange structure. A limiting groove 301 matching with the beveled engaging portion is provided on the outer flange structure.

The cover assembly 50 includes a sealing groove provided on a side surface of the lower cover 52. An elastic seal ring 57 is arranged at the sealing groove. The elastic sealing ring 57 is configured as a V-shaped elastic seal ring 57. An upper end of the elastic seal ring 57 is inclined toward two sides separately, and a lower end of the elastic seal ring 57 is converged together. In this way, the lower end of the elastic seal ring 57 is relatively small, and when the cover assembly 50 is placed on the food container 30, the lower end of the cover assembly 50 can easily enter the food container 30. As the cover assembly 50 is being pressed downward, a beveled surface of the elastic seal ring 57 gradually comes into contact with an upper edge of the food container 30, and the elastic seal ring 57 gradually becomes tensioned, until the slidable buckle 55 is engaged with the beveled engaging portion of the shell assembly 20. As such, the food container 30 is sealed.

The cover assembly 50 further includes a desiccant cover 56 arranged on an inner wall of the lower cover 52. The desiccant cover 56 matches with the food container 30. The desiccant cover 56 is engaged with a bottom inner wall of the lower cover 50 and forms a drying space with the lower cover 52. The drying space is configured for accommodating a desiccant. A plurality of drying holes for communicating the food container 30 with the desiccant are provided on the desiccant cover 56. Water vapor in the food container 30 can enter the drying space through the plurality of drying holes to react with the desiccant for drying the pet food in the food container 30.

It can be understood that the configuration of the elastic pressing assembly as a combined structure including the gripping members 53, the elastic element 54, and the slidable buckles 55 is merely a preferred embodiment of the present disclosure and is not to limit the scope of protection of the elastic pressing assembly. For example, in an embodiment of the present disclosure, the slidable buckle 55 in the elastic pressing assembly is configured as a magnetic element, and a magnetic sheet for engaging with the slidable buckle 55 is arranged on the inner wall of the shell assembly 20; or an end of the slidable buckle 55 in the elastic pressing assembly is configured as a flexible pad, and the flexible pad is pressed to the inner wall of the shell assembly 20. The configuration of the slidable buckle 55 as a magnetic element or a flexible pad eliminates the necessity of arranging the beveled engaging portion on the inner wall of the shell assembly 20, thereby reducing the clearance between the food container 30 and the shell assembly 20. The outer flange structure is arranged at the opening of the food container 30.

The foregoing descriptions are merely preferred specific embodiments of the present disclosure, but are not intended to limit the protection scope of the present disclosure. Any variation or replacement readily figured out by those skilled in the art within the technical scope disclosed in the present disclosure shall fall within the protection scope of the present disclosure. Therefore, the protection scope of the present disclosure is defined by the appended claims.

What is claimed is:
1. A pet feeder, comprising
a food container;
a food exit passage, wherein a first end of the food exit passage is in communication with the food container; and
a food tray, wherein the food tray is in communication with a second end of the food exit passage, wherein a downwardly inclined guide portion is arranged on the food tray, and the downwardly inclined guide portion extends away from a shell assembly and is connected to a feeding trough;
wherein
a food distribution assembly is arranged at a bottom of the food container, the food distribution assembly comprises a food distribution bin arranged at the bottom of the food container, a food falling opening is for communicating the food container with the food distribution bin and is provided at a top of the food distribution bin, and a food distribution hole is for communicating the food distribution bin with the food exit passage and is provided at a bottom of the food distribution bin;
the food distribution assembly further comprises a driving device and a turntable, the turntable is drivingly connected to the driving device, a plurality of flexible impellers are located in the food distribution bin, distributed at intervals, and arranged on a periphery of the turntable, and the food distribution bin is divided by the plurality of flexible impellers into a plurality of food distribution tanks, wherein the plurality of food distribution tanks are stretchable;
food restriction brushes extend into the food distribution bin and are further arranged at the food falling opening, and the food restriction brushes are respectively arranged on two sides of the food falling opening of the food distribution bin;

the pet feeder further comprises a base, the shell assembly comprises a rear shell and a front shell, the rear shell is arranged on the base, the front shell is engaged with the rear shell to define an accommodating space for accommodating the food container with the rear shell, and a food outlet is provided at a bottom of the front shell;

the rear shell comprises a C-shaped semi-barrel structure, an arc-shaped enclosing plate is arranged at a notch on the C-shaped semi-barrel structure and the arc-shaped enclosing plate is distributed in a circumferential direction of the notch, and the front shell is engaged with the C-shaped semi-barrel structure and the arc-shaped enclosing plate;

the C-shaped semi-barrel structure and the arc-shaped enclosing plate form a support structure for the food distribution assembly, the food distribution assembly is in communication with the food outlet through a downwardly inclined tube extending through the support structure, and the food exit passage is formed inside the downwardly inclined tube; and an outer flange structure matching with an inner wall of the front shell is further arranged at a top of the arc-shaped enclosing plate.

2. The pet feeder according to claim 1, wherein the feeding trough is lower than the downwardly inclined guide portion, the food tray further comprises a transition slope for connecting the downwardly inclined guide portion to the feeding trough, and a downward inclination angle of the transition slope is greater than a downward inclination angle of the downwardly inclined guide portion.

3. The pet feeder according to claim 1, wherein a downward inclination angle formed between the downwardly inclined guide portion and a horizontal plane ranges from 15° to 40°.

4. The pet feeder according to claim 1, wherein a food tray base for placing the food tray is arranged on the base, a weighing sensor is connected between the food tray base and the base, and the food tray base is configured to displace vertically under a pressure of the food tray and act on the weighing sensor.

5. The pet feeder according to claim 1, wherein the plurality of flexible impellers each comprise a trapezoidal hollow structure, and two adjacent ones of the plurality of flexible impellers are laterally deformable under squeezing by pet food to enlarge a respective one of the plurality of food distribution tanks.

6. The pet feeder according to claim 1, further comprising a cover assembly, wherein an elastic pressing assembly is arranged at a top of the cover assembly, and a side end of the elastic pressing assembly telescopically extends to a side wall of the cover assembly and is configured to engage with the shell assembly.

7. The pet feeder according to claim 6, wherein a boss-shaped handle is arranged at the top of the cover assembly, two opposing side walls of the boss-shaped handle form two gripping members, and at least one of the two gripping members is connected through an elastic element to a slidable buckle extending out of the side wall of the cover assembly.

8. The pet feeder according to claim 1, wherein a set of through-beam sensors are arranged inside the shell assembly, the set of through-beam sensors transmit signals at a predetermined height through the food container, and the food container is configured as a transparent food container.

* * * * *